United States Patent
Boyer et al.

(10) Patent No.: US 6,364,084 B1
(45) Date of Patent: Apr. 2, 2002

(54) ARMATURE FOR A SELECTIVELY ENGAGEABLE AND DISENGAGEABLE COUPLING

(75) Inventors: Charles A. Boyer, Shirland, IL (US); Jeffrey C. Steiner, Janesville, WI (US)

(73) Assignee: Warner Electric Technology, Inc., Richmond, VA (US)

( * ) Notice: Subject to any disclaimer, the term of this patent is extended or adjusted under 35 U.S.C. 154(b) by 0 days.

(21) Appl. No.: 09/515,779

(22) Filed: Feb. 29, 2000

(51) Int. Cl.[7] ............................................... F16D 19/00
(52) U.S. Cl. ............................ 192/84.961; 192/107 R; 335/279
(58) Field of Search .......................... 192/84.961, 84.1, 192/84.9, 84.96, 66.2, 107 R; 335/279

(56) References Cited

U.S. PATENT DOCUMENTS 5,377,799 A * 1/1995 Mullaney .................. 192/84 C
5,632,366 A * 5/1997 Mullaney .................. 192/84.1
5,642,798 A * 7/1997 Muirhead et al. ...... 192/84.961

* cited by examiner

Primary Examiner—Charles A. Marmor
Assistant Examiner—Saul Rodriguez

(57) ABSTRACT

An armature for a selectively engageable and disengageable coupling and a method of making the armature are provided. The armature includes a substantially annular body that is disposed about a first axis. The body may be formed by stamping or fine-blanking. One side of the body is hardened through a nitriding process. A grinding wheel is then applied at an angle to the same side of the body along a diametrical line of the body extending perpendicular to the first axis. As a result, the body is configured so that the thickness of the body increases as the distance from the diametrical line increases. In particular, the thickness of the body varies along each cross-section taken along the line from a minimum thickness at the innermost portion of the cross-section to a maximum thickness at the outermost portion of the cross-section. The inventive armature reduces galling, and the resulting noise, that occur during burnishing of couplings incorporating the armature.

12 Claims, 2 Drawing Sheets

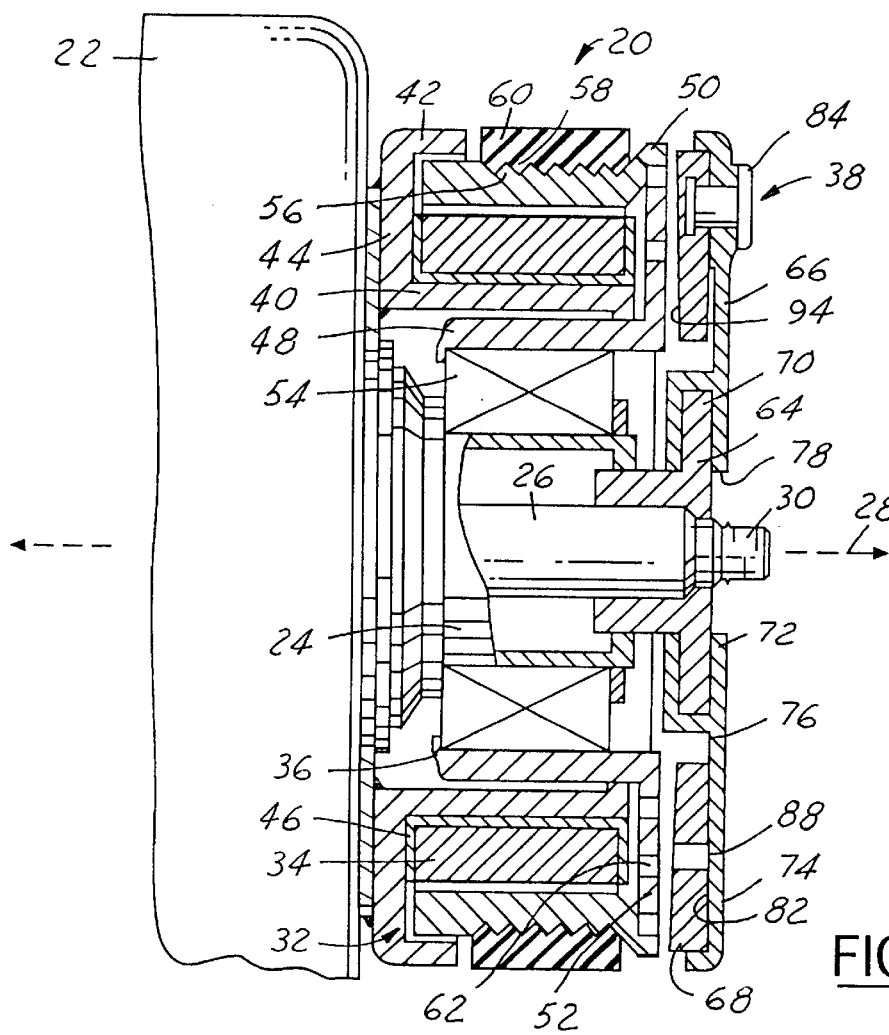
FIG. 1
```
┌─────────────────────┐
│ FORMING A SUBSTANTIALLY │──90
│   ANNULAR BODY 80   │
└──────────┬──────────┘
           ▼
┌─────────────────────┐
│ HARDENING A FIRST SIDE 94 │──92
│      OF BODY 80     │
└──────────┬──────────┘
           ▼
┌─────────────────────┐
│  DEFORMING SIDE 94 OF │──96
│  BODY 80 TO VARY THE │
│  THICKNESS OF BODY 80 │
└─────────────────────┘
```
FIG. 2
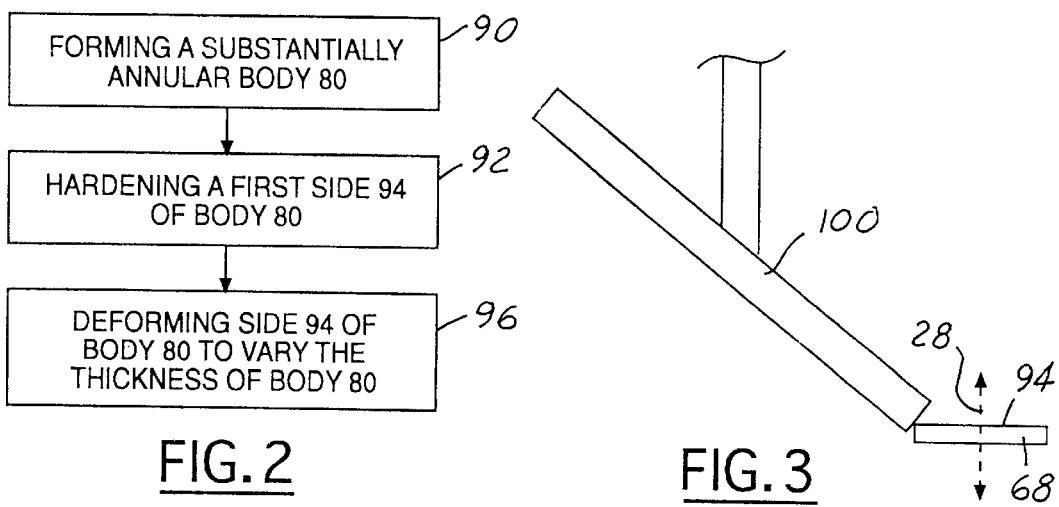
FIG. 3

ARMATURE FOR A SELECTIVELY ENGAGEABLE AND DISENGAGEABLE COUPLING

BACKGROUND OF THE INVENTION

1. Field of the Invention

This invention relates to selectively engageable and disengageable couplings and, in particular, to an armature for use in such couplings that reduces noise generated during burnishing of the coupling.

2. Disclosure of Related Art

A conventional selectively engageable and disengageable coupling for an automotive compressor or similar application includes a rotor assembly, an armature assembly, and means for selectively urging the armature assembly into engagement with the rotor assembly. The rotor assembly may include a rotor having an inner pole ring rotatably supported on the outer race of a bearing that is mounted to the compressor, an outer pole ring configured for engagement with an endless belt by which the rotor is driven, and a friction face connecting the inner and outer pole rings. The armature assembly may include a hub mounted to the compressor drive shaft, a resiliently flexible spider telescopically mounted on the hub, and an armature disc held by a radially outer portion of the spider. The urging means may include an electromagnetic coil disposed within a magnet core supported between the inner and outer pole rings of the rotor. Excitation of the coil creates a magnetic circuit among the magnet core, rotor, and armature whereby the armature is drawn into frictional engagement with the rotor and torque is transferred from the rotor to the compressor drive shaft.

During burnishing of conventional couplings (i.e., during the initial on-off cycles of the coupling wherein the rotor and armature surfaces are ground upon engagement until the surfaces evenly match), galling typically occurs as the metal alloy surfaces of the rotor and armature engage one another. This results in a relatively high level of noise generated by the coupling during burnishing. Moreover, galling can cause the coupling to generate an inconsistent torque and may cause the armature to "slip" relative to the rotor—potentially resulting in a failure of the armature assembly.

The armatures in some conventional couplings have been hardened through the addition of metal plates or a nitriding process. Galling during burnishing of couplings incorporating such armatures is reduced and/or eliminated because of the hardened surface of the armature. The hardened surface, however, makes it difficult to achieve a sufficient torque in the coupling. Further, the hardened surface of the armature produces another type of noise (similar to a knife on glass).

There is thus a need for an armature for a selectively engageable and disengageable coupling that will minimize or eliminate one or more of the above-mentioned deficiencies.

SUMMARY OF THE INVENTION

The present invention provides an armature for a selectively engageable and disengageable coupling and a method of making the armature.

An armature in accordance with the present invention includes a substantially annular body that is disposed about a first axis. One side of the body may be hardened through a nitriding process to reduce galling during burnishing of a coupling including the armature. The body of the armature is configured so that the thickness of the body increases as the distance from a line extending perpendicular to the first axis increases. In particular, the line may be taken across a diameter of the body and the thickness of the body may vary along each cross-section taken along the line from a minimum thickness at the innermost portion of the cross-section to a maximum thickness at the outermost portion of the cross-section.

A method of forming an armature for a selectively engageable and disengageable coupling in accordance with the present invention includes the step of forming a substantially annular body wherein the body is disposed about a first axis. The method also includes the step of hardening a first side of the body through, for example, a nitriding process. Finally, the method includes the step of deforming the first side of the body such that a thickness of the body varies as the distance from a line extending perpendicular to the first axis increases. The deforming step is preferably accomplished by placing a grinding wheel at a predetermined angle and conveying the body past the grinding wheel in a direction perpendicular to the first axis. The grinding wheel forms a trench in the first side of the body along a diameter of the body. As a result, the thickness of the body will vary along each cross-section taken along the diameter from a minimum thickness at the innermost portion of the cross-section to a maximum thickness at the outermost portion of the cross-section.

An armature in accordance with the present invention represents a significant improvement as compared to armatures found in conventional selectively engageable and disengageable couplings. First, because the armature is hardened, galling during burnishing of the coupling is reduced, thereby reducing noise during the burnishing process. The reduction in galling also enables the coupling to generate a more consistent torque during the burnishing process and reduces the likelihood that the armature will "slip" relative to the rotor and that the armature assembly will fail. Second, the deformation of the armature body roughens the hardened surface of the body, thereby increasing the initial torque of the coupling and reducing the time required for burnishing. The roughened surface also reduces the "knife on glass" noise that can result from the engagement of the rotor and the hardened surface of the armature. Third, the variation in thickness of the armature body produced by the deformation—whereby the thickest portions of the armature body are located along the radially outer portions of the body—ensures that the radially outer poles of the armature body will be the first portion of the armature to engage the rotor.

These and other features and objects of this invention will become apparent to one skilled in the art from the following detailed description and the accompanying drawings illustrating features of this invention by way of example.

BRIEF DESCRIPTION OF THE DRAWINGS

FIG. 1 is a cross-sectional view of a selectively engageable and disengageable coupling incorporating an armature in accordance with the present invention.

FIG. 2 is a flowchart diagram illustrating a method of forming an armature in accordance with the present invention.

FIG. 3 is a side plan view illustrating one of the steps in the method illustrated in FIG. 2.

DETAILED DESCRIPTION OF THE PREFERRED EMBODIMENT

Figure 4:
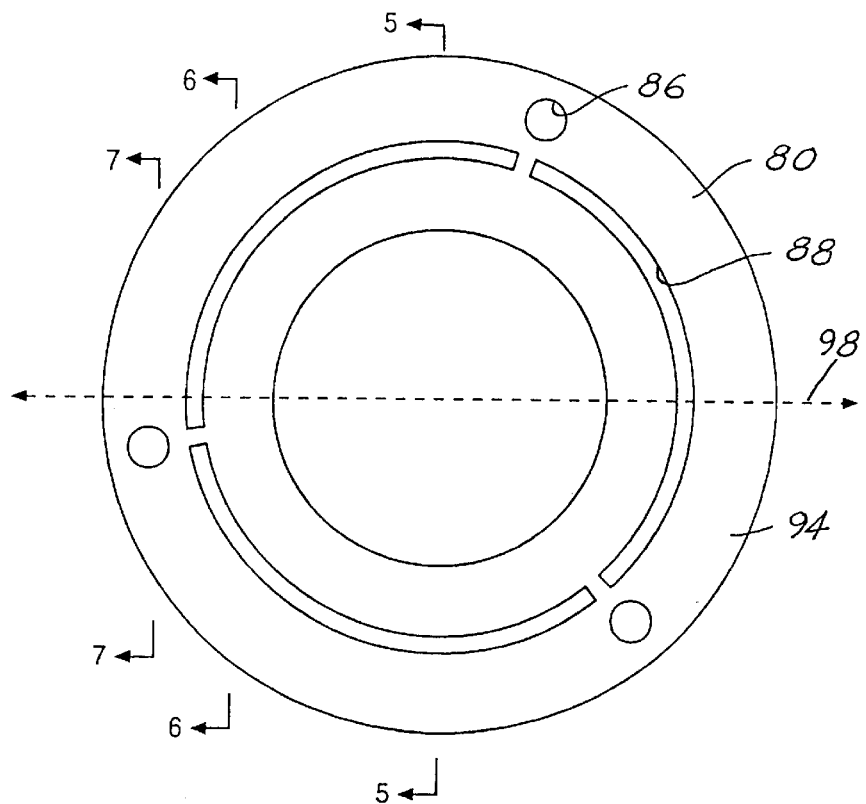
FIG. 4 is a plan view of an armature in accordance with the present invention.
Figure 5:
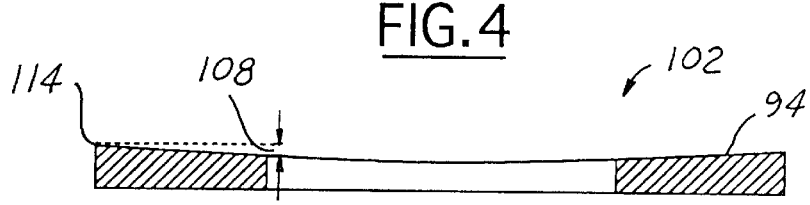
FIGS. 5–7 are cross-sectional views of the armature of FIG. 4 taken substantially along lines 5—5, 6—6, and 7—7, respectively.
Figure 6:
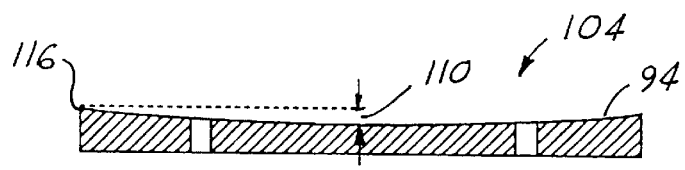
Figure 7:
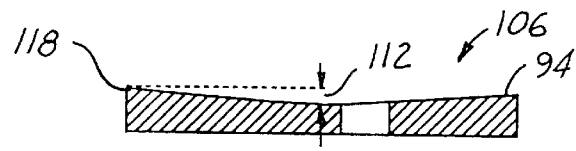

Referring now to the drawings wherein like reference numerals are used to identify identical components in the various views, FIG. 1 illustrates an electromagnetic coupling 20 adapted for use with a compressor 22. It should be understood by those in the art, however, that coupling 20 may be adapted for use in a wide variety of applications. Compressor 22 itself may be used in a variety of conventional applications including vehicular applications. Compressor 22 may include a tubular extension 24 on which coupling 20 is mounted and in which a rotatable drive shaft 26 is disposed. Shaft 26 may be centered about an axis 28 and a threaded shank 30 may extend axially from one end of shaft 26.

Coupling 20 may be provided to impart rotation to—or to prevent rotation of—shaft 26 of compressor 22. In the illustrated embodiment coupling 20 is used as a clutch to selectively transmit torque to shaft 26. It should be understood, however, that coupling 20 could also be used as a brake. Coupling 20 may include a magnet core 32, a coil 34, a rotor 36, and an armature assembly 38.

Magnet core 32 is provided to house coil 34 and forms part of a magnetic circuit used to draw armature assembly 38 into and out of engagement with rotor 36. Core 32 is conventional in the art and may be made from a material having a relatively low magnetic reluctance. Core 32 is annular and is substantially J-shaped in radial cross-section. Core 32 includes axially-extending inner and outer pole rings 40, 42 and a radially extending bridge 44 that connects pole rings 40, 42. Bridge 44 may be ridgily mounted to compressor 22.

Coil 34 is provided to selectively energize and deenergize coupling 20 and to thereby draw armature assembly 38 into and out of engagement with rotor 36. Coil 34 is conventional in the art and may be disposed within an annular U-shaped channel 46 that is connected to a radially outer side of pole ring 40. Excitation of coil 34 creates a magnetic circuit among magnet core 32, rotor 36, and armature assembly 38 whereby armature assembly 38 is drawn into frictional engagement with rotor 36.

Rotor 36 is provided to frictionally engage armature assembly 38 in order to impart rotation to drive shaft 26 of compressor 22. Rotor 36 is conventional in the art and may be made from a material having a relatively low magnetic reluctance such as steel. In particular, rotor 36 may be made from SAE/AISI No. 1006 grade steel. Rotor 36 may be substantially U-shaped in radial cross-section, including inner and outer annular pole pieces 48, 50 and a friction face 52 extending therebetween. Inner pole piece 48 of rotor 36 may be rotatably supported on the outer race of a bearing 54 and may be disposed radially inwardly of pole ring 40 of magnet core 32. Outer pole piece 50 may be disposed radially outwardly of coil 34 and radially inwardly of pole ring 42 of magnet core 32. Outer pole piece 50 may include a plurality of grooves 56 or teeth that are adapted to engage a corresponding plurality of grooves 58 or teeth in an endless belt 60 by which rotor 36 is driven. Friction face 52 may include a plurality of radially-spaced rows of angularly-spaced slots 62 that form a plurality of magnetic poles.

Armature assembly 38 is provided to transmit torque between rotor 36 and drive shaft 26 of compressor 22. Armature assembly 38 may include a hub 64, a resiliently flexible spider 66, and an armature disc 68.

Hub 64 provides a structural framework for armature assembly 38. Hub 64 is conventional in the art and may be made from powdered metal, steel or plastic. Hub 64 is annular and is centered about axis 28. Hub 64 is L-shaped in radial cross-section, having a plurality of radially-extending spokes or teeth 70. Hub 64 may also include a plurality of spline teeth or keys (not shown), configured to be received within corresponding keyways (not shown) in shaft 26 to secure shaft 26 for rotation with hub 64.

Spider 66 is provided to dampen acoustic noise and vibration while allowing axial movement of armature disc 68 for selective engagement with rotor 36. Spider 66 is made from a resiliently flexible material such as plastic and may be injection molded. Spider 66 includes a sleeve 72 that encircles spokes 70 of hub 64 and a web 74 that is integral with sleeve 72 and extends radially outwardly therefrom. Spider 66 is fixed against rotation relative to hub 64, but includes a living hinge 76 at the intersection of web 74 and sleeve 72 that allows web 74 to flex axially back and forth relative to sleeve 72 and hub 64. Spider 66 is annular in construction, having an aperture 78 centered about axis 28.

Armature disc 68 is provided for selective frictional engagement with friction face 52 of rotor 36 to selectively transmit torque from rotor 36 to drive shaft 26 of compressor 22. Referring to FIG. 4, disc 68 may include a substantially annular body 80 formed from a metal alloy such as steel. In particular, disc 68 may be formed from SAE/AISI No. 1006 grade steel. Referring again to FIG. 1, disc 68 may be disposed radially outwardly of hub 64, and may be connected to a first side 82 of spider 66 by one or more rivets 84 or other fastening means. Referring to FIG. 4, Disc 68 may include one or more mounting holes 86 through which rivets 84 extend and disc 68 may also include one or more radially-spaced rows of angularly-spaced slots 88. Slots 88 form a plurality of magnetic poles and, together with slots 62 of rotor 36, cause magnetic flux to weave back and forth between armature disc 68 and rotor 36 upon energization of coil 34.

Referring to FIGS. 2–3, a method of forming armature 68 in accordance with the present invention will be described. The inventive method may include the step 90 of forming a substantially annular body 80. Body 80 may be formed in a conventional manner such as by stamping or fine-blanking. As set forth above, body 80 may be formed from SAE/AISI No. 1006 grade steel. After body 80 is stamped or fine-blanked, body 80 may be ground using a double-disc grinder to attain a desired size for body 80 and to ensure a relatively flat engagement surface for body 80.

A method in accordance with the present invention may also include the step 92 of hardening a first side 94 (best shown in FIGS. 1 and 4) of body 80. Step 92 may include the substep of nitriding body 80 (i.e., forming nitrides in body 80 for surface hardening of body 80). The step of nitriding body 80 may be performed through a conventional ion nitriding process in which nitrogen ions are implanted into the surface of body 80 to form nitrides. Alternatively, the step of nitriding body 80 may be performed by heat-treating body 80 in a gaseous environment as in the process marketed by Lucas Industries plc under the registered trademark NITROTEC. This process produces an iron-nitride casing on body 80 with a iron oxide surface finish. In one constructed embodiment of armature 68, the armature 68 is about 4.5 millimeters thick in an axial direction after formation by stamping or fine-blanking and the nitriding process produces a hardened layer extending about 0.4 millimeters deep on side 94 of body 80 along the axis 28 of body 80. In the constructed embodiment, side 94 of body 80 attains a hardness of RB 85 to 90 (which is subsequently reduced to RB 75 to 80 after the deformation step described hereinbelow).

A method in accordance with the present invention may also include the step 96 of deforming side 94 of body 80 such that the thickness of body 80 varies as the distance from a line 98 (best shown in FIG. 4) extending perpendicular to the central axis 28 of body 80 increases. In a preferred embodiment, line 98 extends across a diameter of body 80 as shown in FIG. 4. Referring to FIG. 3, step 96 may include the substep of placing a grinding wheel 100 at a predetermined angle relative to the central axis 28 of body 80 and to side 94 of body 80. Step 96 may also include the substep of conveying body 80 past grinding wheel 100. In one constructed embodiment, armature 68 was ground using a thru-feed grinder having an eighteen (18) inch grinding wheel sold by Speedfam Corporation of Des Plaines, Ill. Wheel 100 is preferably sized and angled relative to body 80 so as to grind the entire surface of side 94 of body 80. It should be understood, however, that the size and angular orientation of wheel 100 may vary and that only a portion of side 94 may be ground without departing from the spirit of the present invention.

A method in accordance with the present invention may finally include the steps of washing body 80 and applying a rust inhibitor. The rust inhibitor may comprise the solution marketed by Dubois under the number 200NT.

As mentioned hereinabove, and with reference now to FIGS. 4–7, in an armature 68 in accordance with the present invention the thickness of body 80 (i.e., the axial length of body 80 relative to its central axis 28) increases as its distance from a line 98 extending perpendicular to axis 28 increases. As illustrated in FIG. 4, line 98 preferably comprises a diametrical line extending across body 80. As a result, and with reference to FIGS. 5–7, the thickness of body 80 in any cross-section 102, 104, 106 taken along line 98 varies from a minimum thickness at the innermost portion 108, 110, 112, respectively, of each cross-section 102, 104, 106 to a maximum thickness at the outermost portion 114, 116, 118, respectively, of each cross-section 102, 104, 106. In one constructed embodiment the variation in thickness from the thinnest portion of body 80 (along the diametrical line 98) to the thickest portion of body 80 (at the radially outer periphery of body 80) was about 0.1 millimeters.

An armature 68 for a selectively engageable and disengageable coupling in accordance with the present invention represents a significant improvement as compared to conventional armatures found in such couplings. First, because armature 68 is hardened, galling during burnishing of the coupling is reduced, thereby reducing noise during the burnishing process. Further, the reduction in galling reduces inconsistencies in torque generated by coupling 20 and reduces the likelihood that armature 68 will slip relative to rotor 36—thereby decreasing the likelihood of a failure of armature assembly 38. Second, the deformation of armature body 80 roughens the hardened surface on side 94 of armature body 80, thereby increasing the initial torque of the coupling and reducing the time required for burnishing. The roughened surface also reduces the "knife on glass" noise that can result from the engagement of rotor 36 and the hardened surface of armature 68. In constructed embodiments, the armature 68 had a roughness average, or $R_a$, of 50–100. Third, the variation in thickness of armature body 80 produced by the deformation—whereby the thickest portions of armature 68 are located along the radially outer portions of armature 68—ensures that the radially outer poles of armature 68 will engage rotor 36 first.

While the invention has been particularly shown and described with reference to the preferred embodiments thereof, it is well understood by those skilled in the art that various changes and modifications can be made in the invention without departing from the spirit and scope of the invention.

We claim:

1. An armature for a selectively engageable and disengageable coupling, said armature comprising:

a substantially annular body disposed about a first axis;

wherein a thickness of said body continually increases as the distance from a line extending perpendicular to said first axis increases and said thickness of said body is constant about said line.

2. The armature of claim 1 wherein said body includes a plurality of angularly spaced slots.

3. The armature of claim 1 wherein said body includes a plurality of angularly spaced mounting holes.

4. The armature of claim 1 wherein said line extends across a diameter of said body.

5. The armature of claim 4 wherein said thickness of said body varies along each cross-section taken along said line from a minimum thickness at an innermost portion of said cross-section to a maximum thickness at an outermost portion of said cross-section.

6. The armature of claim 1 wherein said thickness of said body is uniform along said line.

7. An armature for a selectively engageable and disengageable coupling, said armature comprising:

a substantially annular body disposed about a first axis;

wherein a first side of said body is hardened by nitriding and a thickness of said body continually increases as the distance from a line extending perpendicular to said first axis increases and said thickness of said body is constant about said line.

8. The armature of claim 7 wherein said body includes a plurality of angularly spaced slots.

9. The armature of claim 7 wherein said body includes a plurality of angularly spaced mounting holes.

10. The armature of claim 7 wherein said line extends across a diameter of said body.

11. The armature of claim 10 wherein said thickness of said body varies along each cross-section taken along said line from a minimum thickness at an innermost portion of said cross-section to a maximum thickness at an outermost portion of said cross-section.

12. The armature of claim 7 wherein said thickness of said body is uniform along said line.

* * * * *